(12) United States Patent
Sheeran et al.

(10) Patent No.: US 7,471,025 B2
(45) Date of Patent: Dec. 30, 2008

(54) SEGMENTED STATOR WITH IMPROVED HANDLING AND WINDING CHARACTERISTICS

(75) Inventors: Kent A. Sheeran, Festus, MO (US); Payman Rassoolkhani, Maryland Heights, MO (US); Paul G. Michaels, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 12/029,998

(22) Filed: Feb. 12, 2008

(65) Prior Publication Data

US 2008/0129142 A1    Jun. 5, 2008

Related U.S. Application Data

(60) Continuation of application No. 11/534,705, filed on Sep. 25, 2006, now Pat. No. 7,345,397, and a division of application No. 10/427,450, filed on Apr. 30, 2003, now Pat. No. 7,111,380.

(60) Provisional application No. 60/422,676, filed on Oct. 31, 2002.

(51) Int. Cl.
  *H02K 1/06* (2006.01)
(52) U.S. Cl. ........................ 310/217; 310/218
(58) Field of Classification Search .......... 310/216–218
  See application file for complete search history.

(56) References Cited

U.S. PATENT DOCUMENTS

| | | |
|---|---|---|
| 4,350,914 A | 9/1982 | Searle |
| 5,592,731 A | 1/1997 | Huang |
| 5,729,072 A | 3/1998 | Hirano |
| 6,081,059 A | 6/2000 | Hsu |
| 6,121,711 A | 9/2000 | Nakahara |
| 6,127,753 A | 10/2000 | Yamazaki |
| 6,177,751 B1 | 1/2001 | Suzuki |
| 6,226,856 B1 | 5/2001 | Kazama |

(Continued)

FOREIGN PATENT DOCUMENTS

JP    11-089128    3/1990

(Continued)

OTHER PUBLICATIONS

International Search Report, PCT/US03/32557, dated Feb. 27, 2004, 3 pgs.

*Primary Examiner*—Dang D Le
(74) *Attorney, Agent, or Firm*—Senniger Powers LLP

(57) ABSTRACT

A stator assembly has discrete stacks of laminations. A plurality of nonmagnetic containment structures define pockets. The stacks are at least partially received in the pockets and coupled to one another by the containment structure. The containment structures are moveable between a first configuration in which the stacks are separate from one another and a second configuration in which yokes of adjacent stacks are in physical contact with one another. In a method of making a stator assembly, a plurality of stator segments are positioned so each is received in one of a plurality of pockets in a containment structure. Coils are wound around each stator segment while the containment structure prevents the stator segment from having direct physical contact with another stator segment. The containment structure is reconfigured to bring the wound stator segments into contact with one another, thereby forming a closed magnetic circuit.

8 Claims, 9 Drawing Sheets

U.S. PATENT DOCUMENTS

| | | | |
|---|---|---|---|
| 6,362,553 B1 | 3/2002 | Nakahara | |
| 6,369,687 B1 | 4/2002 | Akita | |
| 6,487,769 B2 | 12/2002 | Ketterer | |
| 6,504,284 B1 | 1/2003 | Kazama | |
| 6,509,665 B1 | 1/2003 | Nishiyama | |
| 6,573,632 B2 | 6/2003 | Hsu | |
| 6,584,813 B2 | 7/2003 | Peachee | |
| 6,659,385 B2 | 12/2003 | Akita | |
| 6,700,284 B2 | 3/2004 | Williams | |
| 6,737,778 B2 | 5/2004 | Daikoku | |
| 6,741,005 B2 | 5/2004 | Vohlgemuth | |
| 6,744,166 B2 | 6/2004 | Harter | |
| 6,856,064 B2 | 2/2005 | Masumoto | |
| 6,897,591 B2 | 5/2005 | Peachee | |
| 7,012,350 B2 | 3/2006 | Peachee | |
| 7,067,952 B2 * | 6/2006 | Neal | 310/259 |
| 7,084,545 B2 * | 8/2006 | Happel | 310/218 |
| 2001/0030483 A1 | 10/2001 | Masumoto | |
| 2002/0093269 A1 | 7/2002 | Harter | |
| 2002/0139606 A1 | 10/2002 | Williams | |
| 2004/0051417 A1 | 3/2004 | Yamazaki | |

FOREIGN PATENT DOCUMENTS

| | | |
|---|---|---|
| JP | 7-245895 | 9/1995 |
| JP | 9-191588 | 7/1997 |
| JP | 11-341717 | 12/1999 |
| JP | 2001-025185 | 1/2001 |
| JP | 2002-218716 | 2/2002 |
| JP | 2002-305848 | 10/2002 |
| WO | 02-47240 A1 | 6/2002 |

* cited by examiner

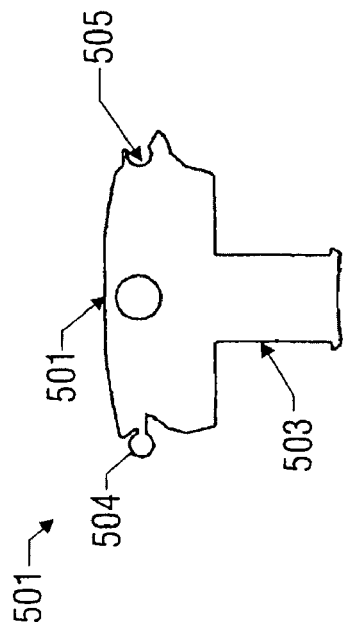
FIG. 5B2
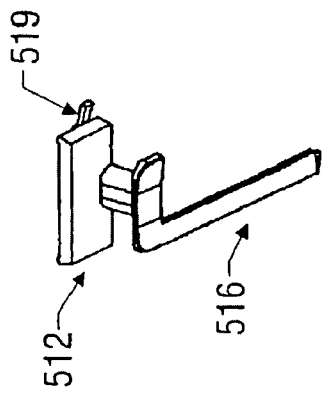
FIG. 5C2
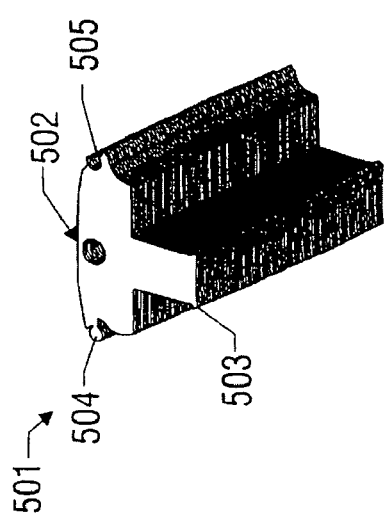
FIG. 5B1
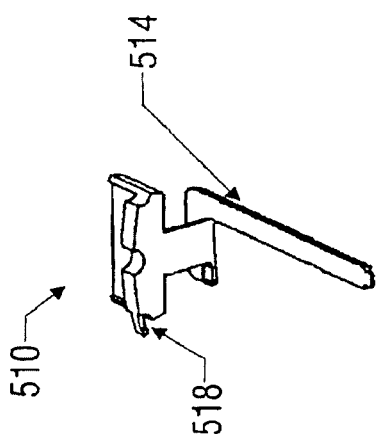
FIG. 5C1

SEGMENTED STATOR WITH IMPROVED HANDLING AND WINDING CHARACTERISTICS

CROSS-REFERENCE TO RELATED APPLICATIONS

This application is a continuation of pending U.S. patent application Ser. No. 11/534,705, filed Sep. 25, 2006, which is a division of U.S. Pat. No. 7,111,380, filed Apr. 30, 2003, which claims priority from Provisional Patent Application Ser. No. 60/422,676 filed Oct. 31, 2002, each of which is hereby incorporated by reference.

FIELD OF THE INVENTION

The present disclosure relates to stator assemblies for electromagnetic machines and, more particularly, to segmented stator assemblies in which the stator is formed from a number of discrete stator stacks or segments with each stator segment comprising a yoke portion, a tooth portion and a coil winding wound about the tooth.

BACKGROUND OF THE INVENTION

While the use of distinct and separately wound stator segments provides some benefits, it potentially increases the complexity and costs of manufacturing operations. For example, in many segmented stators the stator segments are wound individually and one or more manufacturing steps are required to appropriately interconnect all the individual stator coils to form the phase windings. In such conventional stator assemblies, because the distinct and separately wound stator segments are not coupled together during the winding operation, some retention structure is required to hold the stator segments together when they are formed into an annular stator. The requirements for the coil interconnecting step, the materials and equipment required for the same, and the need for a secondary retention mechanism often require a significant capital investment in manufacturing equipment to manufacture such machines and significant material cost adds to the component costs of machines made according to such processes.

In an effort to overcome some of the limitations associated with stator assemblies having separately-wound stator segments as described above, approaches were developed wherein magnetically-interconnected stator segments were physically coupled to one another prior to the winding operation such that the coils could be formed in an interconnected manner. In known conventional approaches, the stator segments were interconnected though the use of hinges, sometimes referred to as puzzle lock connections, or through the use of thin interconnecting bridges of magnetically permeable materials. Such interconnecting structure often requires relatively complex stator lamination constructions, which can increase the overall manufacturing costs for a machine utilizing such a design. Moreover, the manufacturing steps required to couple the distinct stator segments together via the hinge or puzzle lock structure increases the cost and complexity of the manufacturing process.

One limitation of stator assemblies using interconnecting puzzle pieces or bridges is that the stator assembly is often fairly inflexible and access to the stator teeth during the winding operation is somewhat limited. These limitations can restrict the extent to which magnetic wires can be placed in the stator to form the stator windings or, in other words, the "slot fill."

An alternate conventional approach for forming a "segmented stator like" machine that does not require the use of hinges or puzzle locks relies upon the use of a stator assembly formed from groupings of stator segments that are magnetically coupled together by a thin, interconnecting bridge. Such a design is disclosed, for example, in Japanese Patent B-30107085. Through the use of such a bridge, it appears possible to have a grouping of three stator teeth that are coupled together magnetically by a bridge element but that are opened to some degree allowing greater access to the stator teeth and, thus, greater slot fill. One limitation of this approach is that the stator assembly will typically require more than three stator teeth such that construction of the complete stator assembly will require the use of multiple groupings of three stator segments, which necessitates multiple manufacturing steps of coupling the winding coils from the stator groupings together and structure for coupling the multiple stator groupings to form an annular stator. Such additional manufacturing steps and structure can significantly increase the costs and manufacturing complexity associated with such stators.

The present disclosure describes several embodiments of a stator assembly that are designed to address the described and other limiting characteristics of conventional segmented stator assemblies.

SUMMARY OF THE INVENTION

In one aspect, the present invention is directed to a stator assembly. The assembly has a plurality of discrete stacks of laminations. Each of the stacks has a yoke and a tooth extending away from the yoke. A plurality of nonmagnetic containment structures define pockets. The stacks are at least partially received in the pockets. The containment structures couple the stacks to one another. The containment structures are moveable between a first configuration in which the stacks are separate from one another and a second configuration in which the yokes of adjacent stacks are in physical contact with one another to form a magnetic circuit.

Another aspect of the invention is a method of making a stator assembly. The method includes positioning a plurality of stator segments so each stator segment is received in one of a plurality of pockets in a containment structure. Coils are wound around each of the stator segments while the containment structure prevents the respective stator segment from having direct physical contact with another stator segment. The containment structure is reconfigured to bring the wound stator segments into contact with one another, thereby forming a closed magnetic circuit.

Still another aspect of the present invention is a method of making a stator assembly comprising a plurality of stator segments and windings coiled around the stator segments. A plurality of stator segments are sandwiched between first and second containment structures having a series of pockets connected by flexible hinges so each stator segment is received in a pocket of the first containment structure and received in a pocket of the second containment structure. Coils are wound around the stator segments. The containment structures are reconfigured to bring the wound stator segments into contact with one another, thereby forming a closed magnetic circuit.

Other objects and features will be in part apparent and in part pointed out hereinafter.

BRIEF DESCRIPTION OF THE DRAWINGS

FIGS. 5A-5C generally illustrate an alternate embodiment of a stator assembly that may be used in connection with the exemplary winding process described in connection with FIG. 4.

Corresponding reference characters indicate corresponding parts throughout the drawings.

DESCRIPTION OF THE PREFERRED EMBODIMENTS

Turning to the drawings, and in particular to FIGS. 1A-1D, an exemplary embodiment of an improved segmented stator assembly 10 constructed in accordance with certain teachings of this disclosure is illustrated.

Figure 1A:
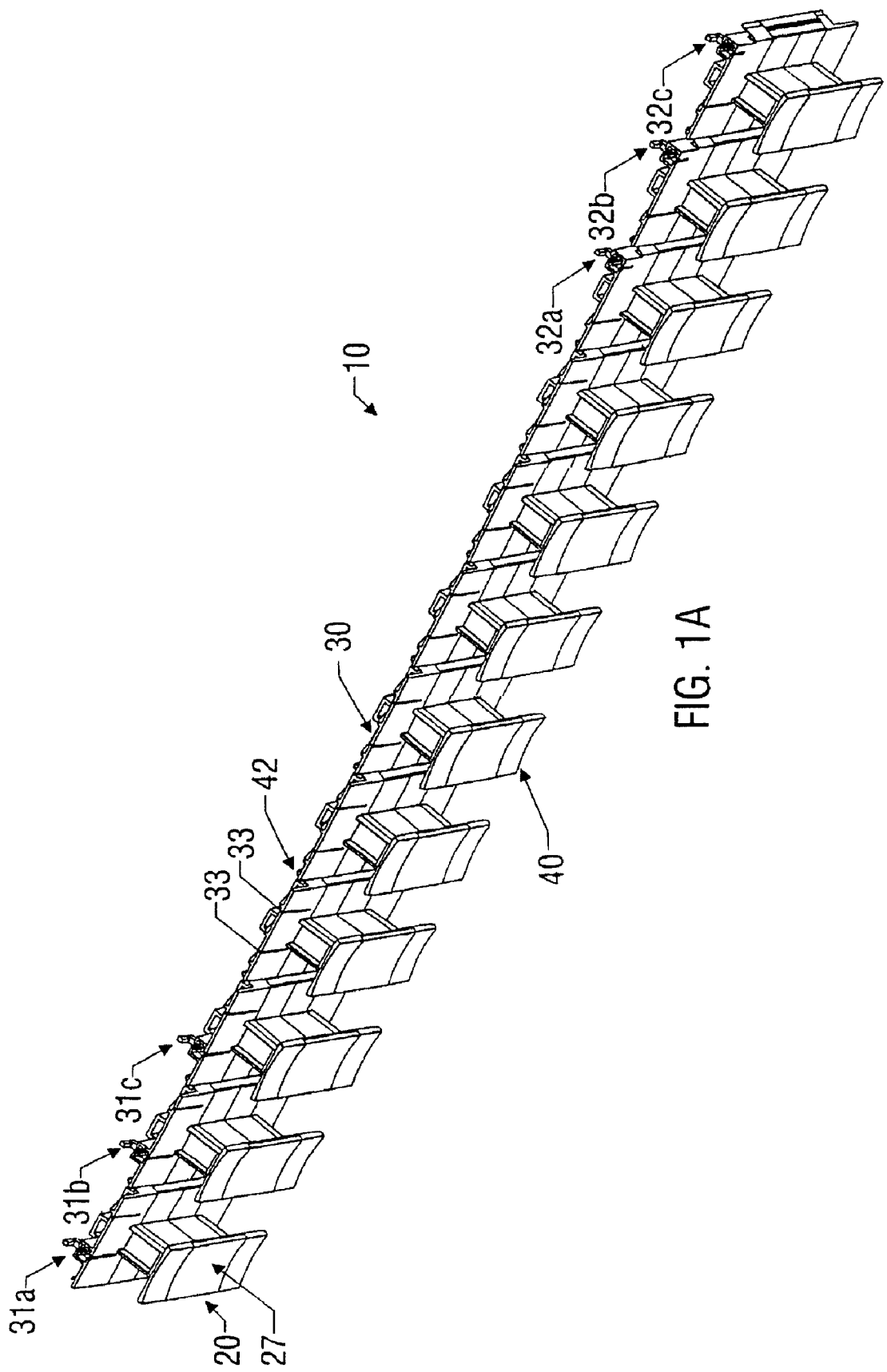
FIGS. 1A-1D illustrate portions of an exemplary stator assembly constructed in accordance with certain teachings of this disclosure prior to the rounding of such a stator assembly into an annular form.
Figure 1B:
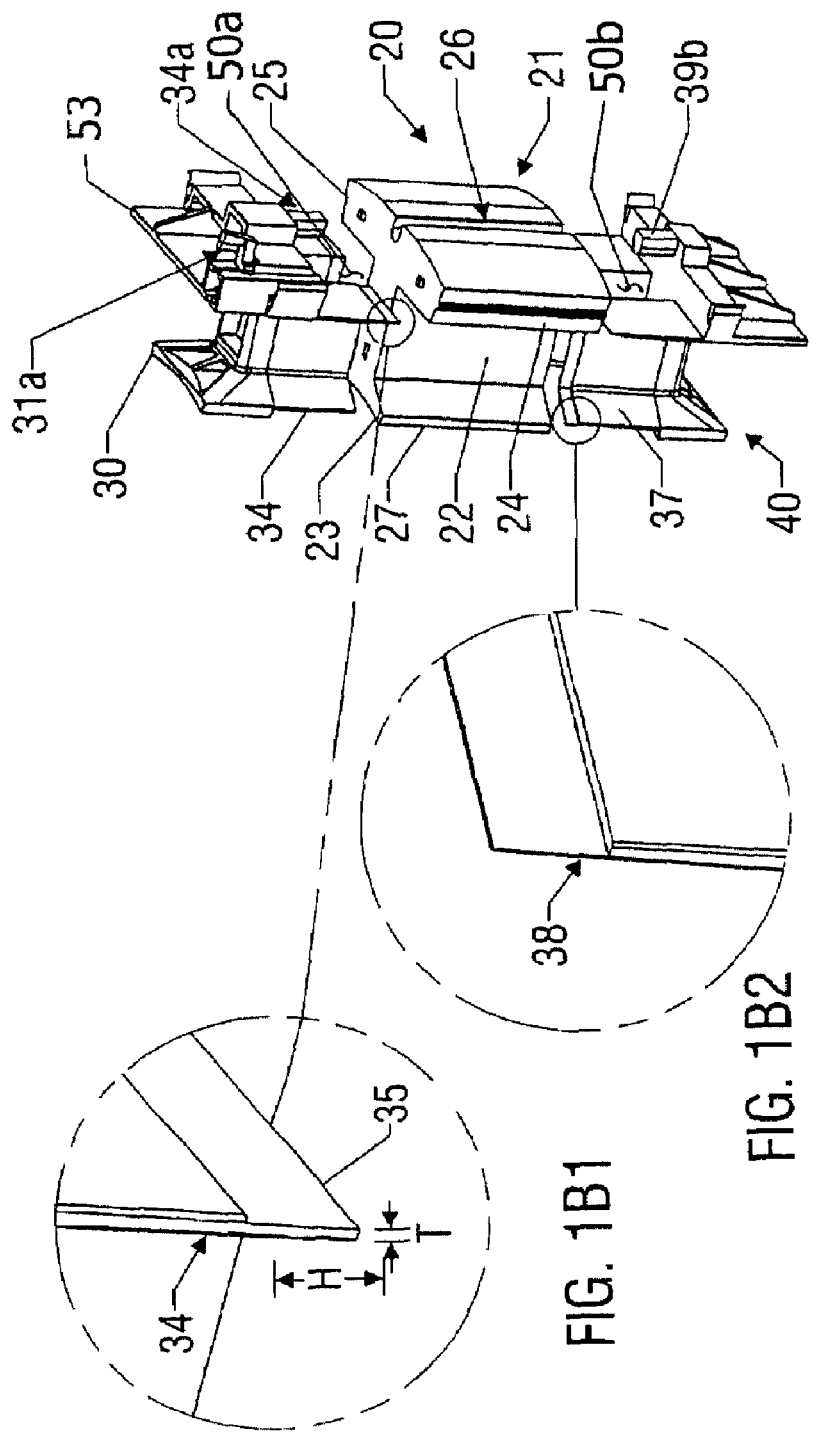
Figure 1D:
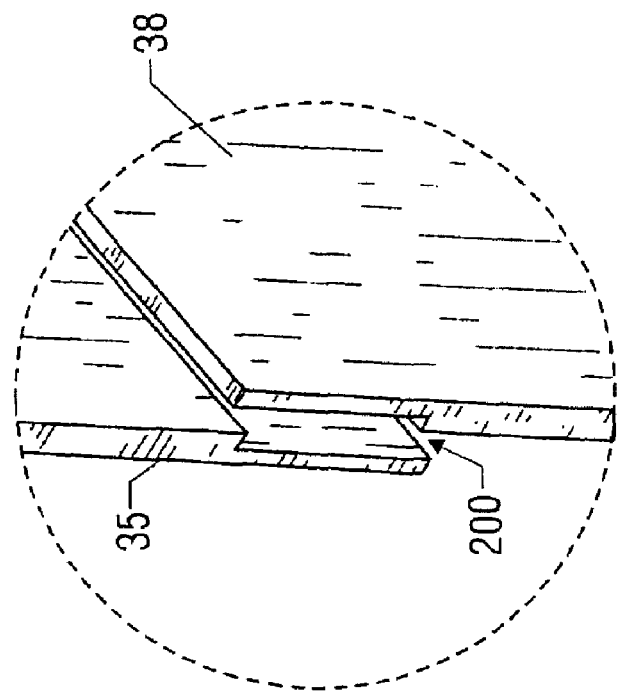
Figure 1C:
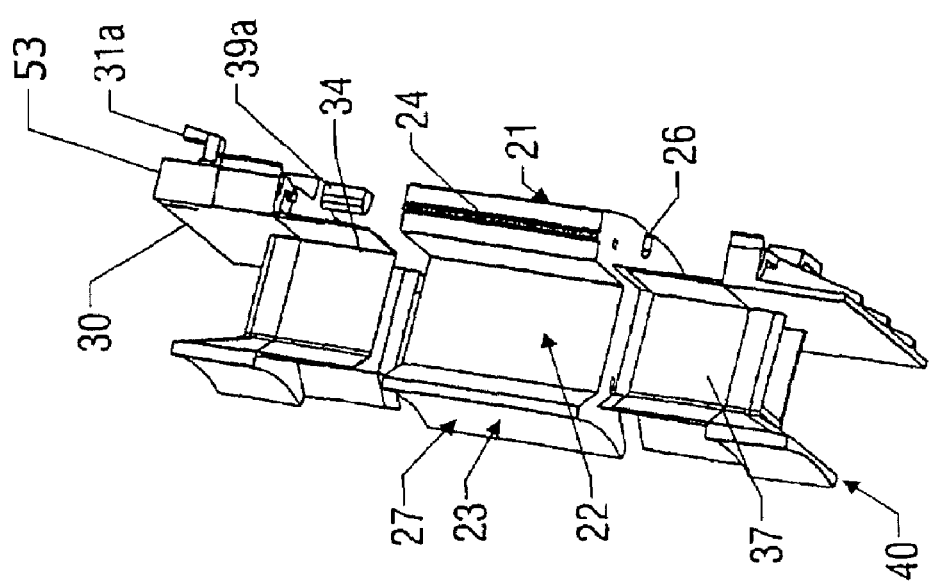

Referring to FIGS. 1A-1C, the stator assembly 10 includes a plurality of discrete, non-interconnected stator segments 20 sandwiched between two containment structures 30 and 40. In general, the stator segments 20 are formed form stacks of substantially identical laminations. The stator segments 20 are not directly interconnected or magnetically coupled to one another. The stator segments are positioned within and held in place by pockets in the containment structures 30 and 40 that are designed and shaped to receive the stator segments. The containment structures define flexible hinges that couple the pockets that contain the stator segments 20 to one another. The containment structure is not magnetically conductive. During construction, the independent stator segments 20 are sandwiched between the containment structures 30 and 40. Then, while the stator segments are isolated from one another by the containment structures 30 and 40, wire is wound about the teeth of the stator segments to form stator coils and phase windings. After winding, the stator assembly 10 is rounded into an annular form, bringing the stator segments into physical contact with one another and forming a closed magnetic circuit to form a completed stator. Details of this exemplary embodiment are provided below.

Stator assembly 10 includes twelve stator segments 20, although alternate embodiments with a different number of stator segments 20 are envisioned and possible. The construction of each stator segment 20 is similar to the construction of the stator segments used in conventional segmented stator assemblies. Each stator segment 20 is formed form a stack of substantially identical laminations, typically stamped from steel. As best reflected in FIGS. 1B and 1C, each stack of laminations defines a main yoke portion 21 and an extending tooth portion 22 that terminates in a "T" shaped portion 23.

The yoke portion 21 of each stator stack defines an engagement projection 24 on one side of the yoke 21, and an engagement notch 25 on the opposing side of the yoke 21. The engagement projection 24 and the engagement notch 25 are sized such that when adjacent stator segments 20 are brought together the engagement projection 24 will be received in the engagement notch 25. This inhibits relative movement of the adjacent stator segments 20 in at least one direction. Notably, unlike prior art configurations where interlocking puzzle pieces serve to physically connect adjacent stator pieces together, the engagement notches and projections of the exemplary embodiment do not perform that function. Absent some other retaining structure, the engagement notches and projections will not physically interconnect or hold together adjacent stator segment pieces.

In addition to defining engagement notches and projections as described above, the yoke portions 21 of each stator segment also define a rear channel 26. Rear channel 26 is sized to receive in a press-fit relationship a portion of the containment structures 30 and 40 to help couple the stator segments to the containment structures. This is described in more detail below.

The "T" shaped portion 23 of each stator stack 20 defines an outer section 27 that upon complete assembly will be exposed and define a rotor bore and an inner section 28. The inner section 28 is configured to help position and retain a motor winding coil in a desired position with respect to the stator tooth as described in more detail below.

As described above, stator segments 20 are not physically coupled together by hinges, interlocking puzzle pieces or other features that are themselves part of the stator segments. To the contrary, no direct, stator segment-to-stator segment coupling exists between the stator segments 12. The two containment structures 30 and 40 "sandwich" the stator segments to form a relatively flexible stator assembly that is relatively easy to construct and wind. The stator assembly is held together in a form analogous to a "rack-of-ribs" where, in an open arrangement as illustrated in FIG. 1A, the solid stator segment assemblies 20 do not make contact and are not coupled together but are attached by a flexible member. The flexible member is the hinges of containment structures 30 and 40.

Referring to FIG. 1C, details of one the containment structures 30 and 40 are illustrated. In general, each of the containment structures 30 and 40 comprises a flexible plastic structure that defines various recesses 50a and 50b or "pockets" in which a stator segment 20 may be positioned and held. The pockets are held together by an integral flexible hinges. Slits and positioning features (not illustrated in FIGS. 1A-1D) are provided to ensure proper positioning of the winding coils. Upon final assembly, these positioning features will be placed about the stator poles.

The stator assembly is constructed so as to accommodate three phase windings with each phase winding comprising winding coils wound about the teeth of four stator segments 20. To accommodate the end-terminals of the three phase windings, the upper containment structure 30 includes six terminal retention features 31a, 31b, 31c, and 32a, 32b, and 32c that can be used to position and maintain the end terminals of three phase windings A, B and C (not illustrated in the figures). Each of the terminal retention features comprises a slit formed in the containment structure and a projecting post around which a portion of the terminal end of the phase winding may be wrapped to position the terminal end of the winding in a fixed location.

In addition to including the terminal retention fixtures, the pockets that form the containment structure 30 also define slits 33. These slits allow the wires that form the phase windings to pass from the portion of the containment structure 30 that faces the interior of the rotor bore to the portion of the containment structure 30 that faces the exterior of the stator assembly. As described in more detail below, the slits 33 are positioned to ensure that the wires that form the winding coils are positioned in a defined relationship to the stator assembly and to any exterior shell member into which the stator assembly 10 may be positioned.

Additional details of the pockets that form containment members 30 and 40 are depicted in FIGS. 1B and 1C, which illustrate corresponding portions of the upper containment structure 30 and the lower containment structure 40 for holding a single stator segment 20. Neither the hinges that would connect the illustrated portions of the containment structures 30 and 40 to adjacent portions nor the adjacent portions themselves are depicted in FIGS. 1B and 1C.

Referring to FIGS. 1B and 1C it may be noted that the containment structure 30 defines a top portion 53 that, when placed over a stator segment 20, will generally rest on top of the stator segment 20. The containment structure 30 further defines downwardly extending portions 34 that extend downwardly from the top portion 53. The downwardly extending portions 34 are shaped to slide over the extending portion 22 of the stator segment. There are two downwardly extending portions 34 for each pocket of the upper containment structure that will slide over and cover the opposing sides of the extending portion 22 of the stator segment. As depicted in FIG. 1B1, the ends of the downwardly extending portions 34 define a notched area 35 having a height H and a thickness T where the portion 24 changes from a first thickness to a second thickness.

Figure 2:
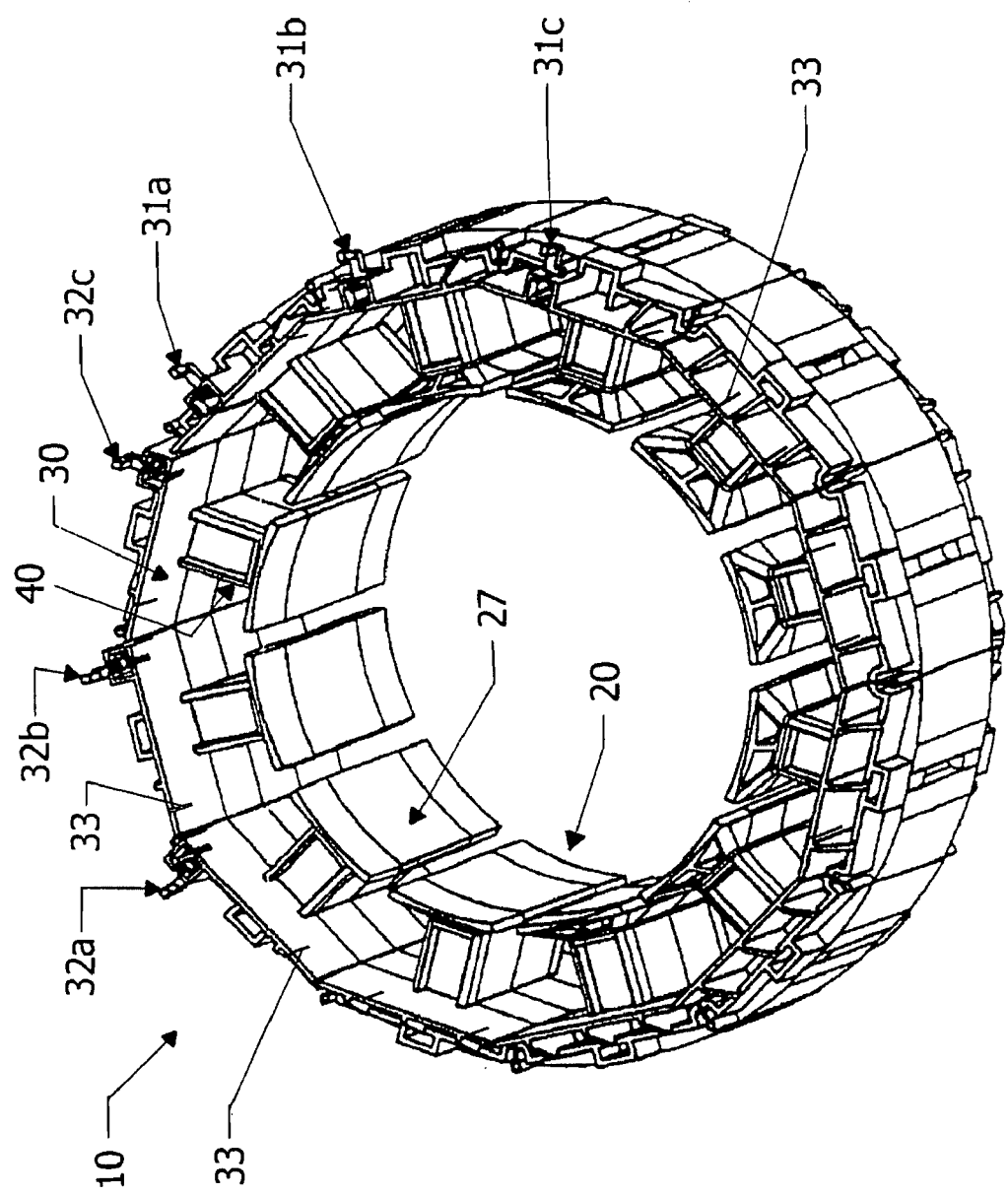
FIG. 2 generally illustrates an exemplary stator assembly constructed in accordance with certain teachings of this disclosure after it has been rounded into an annular form.

As further depicted in FIGS. 1B and 1C the lower containment structure 40 defines a bottom portion that will rest on the bottom of the stator segment. The pockets of the lower containment structure 40 further define upwardly extending portions 37 that extend upwardly along the extending position of the stator segment 20. As depicted in FIG. 1B2 the upwardly extending portions 37 define notched areas 38 that are sized to be received in the notch 35 defined by the downwardly extending portions of the upper containment structure 40.

The notched structures of the upper and lower containment structures engage one another in a manner generally reflected in FIG. 1D such that there is no direct path through any opening from the exterior of the insulating surface to the metal forming the stator tooth. Specifically, as reflected in FIG. 1D, the only path from the exterior of the insulator to the metal forming the stator tooth would be though the small opening 200, and up the interface between the notched surfaces 35 and 38 and across the small opening. This engagement of notched surfaces ensures that the winding coils are adequately insulated from the stator teeth.

The upper and lower containment structures 30 and 40 further define extending flanges at the end of the structures that fit near the T-shaped ends of the stator assemblies. The containment structures 30 and 40 further define upper and lower projections 39a and 39b that are configured to fit into the channels 26 formed in the stator segments in a press-fit relationship to help join the containment structures 30 and 40 onto the stator segments 20 and to prevent relative movement between the stator segments 20 and the upper and lower containment structures 30 and 40.

As FIGS. 1A-1C illustrate, when the containment structures 30 and 40 are placed over a group of stator segments 20 such that multiple stator segments are sandwiched between the containment structures 30 and 40, portions of the containment structures 30 and 40 will surround and encase the extending portions 22 of the stator segments 20. Additionally, containment structures 30 and 40 will provide an insulating barrier between the region interior of the T-shaped portion of the stator segments 20 and the T-shaped end of the stator segments and between the region interior of the T-shaped end of the stator segments and the portion of the yokes of the stator segments that will face inwardly towards the stator bore. When positioned about the stator, the containment structures 30 and 40 thus insulate any winding coil wound about the stator teeth of the stator segments 20 from the metal forming the stator segments. As reflected best in FIG. 1A, a portion 27 of each stator tooth is not covered by any portion of the containment structures and such exposed section will extend into the interior rotor bore when the stator assembly is rounded into an annular form.

Figure 3A:
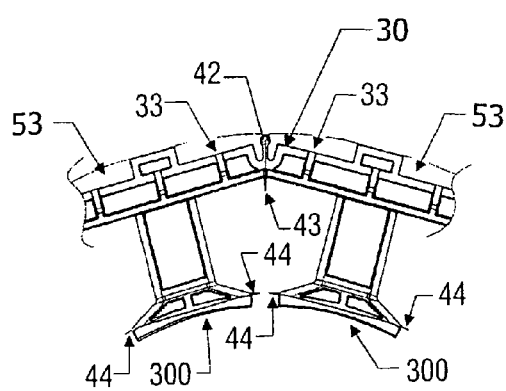
FIGS. 3A and 3B generally illustrate certain aspects of a hinge assembly that may be used in connection with the exemplary embodiment of FIGS. 1A-1C and 2.
Figure 3B:
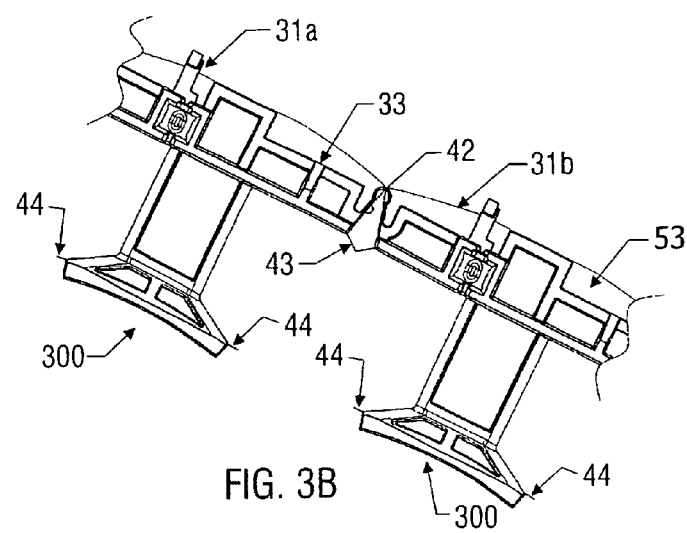

Additional details of the upper and lower containment structures 30 and 40 are illustrated in FIG. 3A and FIG. 3B, which illustrate a top down view of a portion of an exemplary upper containment structure 30. As illustrated, the containment structure 30 defines, for each pocket, an end portion 300 that fits over the T-shaped end of the stator assembly 20. While not illustrated in FIGS. 3A and 3B, a similarly shaped portion exists on the lower containment structure 40. The end portion 300 is ramped to define a surface that will tend to cause any winding coil wound about the stator teeth to be pressed into or retained within the slot that will exit between adjacent stator teeth.

FIGS. 3A and 3B further illustrate details of exemplary embodiments of hinge 42 that connects the upper containment member 30. Similar hinges are found on the lower containment member 40. As illustrated, the hinge 42 comprises a small region of thin plastic that couples adjacent pockets of the containment structures together. The hinge element 42 is a "living hinge" in that it is relatively freely bendable in both directions. Moreover, the point of the hinge at which the bending occurs is substantially at the outer periphery of the stator assembly when the stator assembly is rounded into an annular form. FIG. 3A illustrates a hinge 42 in a closed configuration and FIG. 3B illustrates an exemplary hinge 42 in a generally open configuration. The pockets of FIG. 3B are not pockets associated with the terminals of the phase windings and, as such, no terminal retention features are illustrated in the figure. The slits 33 for allowing passage of the wire forming the winding coils from the interior of the stator assembly to the exterior of the stator assembly are illustrated in FIGS. 3A and 3B.

After the stator core segments 10 are positioned within the containment structures 30 and 40 to form a flexible strip assembly as depicted in FIG. 1A, winding coils are wound about the stator teeth so as to form a plurality of phase windings. In the example of FIGS. 1A-1D, winding coils may be positioned to provide three phase windings, with each phase winding including four winding coils. Other constructions are possible with the phase winding including fewer or greater numbers of winding coils.

The phase windings are formed by the following process. First, beginning of one phase winding is inserted into a terminal retention feature. Then, a winding coil is formed about the appropriate stator tooth. The wire is run out towards the back of the containment structure 30 through a slit 33, through the back of the portion of the containment structure associated with the next two adjacent stator teeth, bringing the wire in towards the tooth of the third adjacent stator teeth through a slit 33 in the relevant portion of the containment structure. This process is repeated until all the winding coils for the phase winding are formed.

The winding procedure described above can be accomplished in a variety of ways. In accordance with one exemplary winding process, a needle winding process is used wherein the coils that form the phase winding may be wound individually. In an alternate process, the coils that form the phase windings are wound simultaneously with one needle being provided for each phase windings.

One of the benefits of the "living" hinge illustrated above is that the stator assembly 10, prior to being rounded into an annular form, can be fully opened to allow greater access to the slot area for winding, thus allowing a greater slot fill and allowing for enhanced precision winding techniques. The ability of the described embodiment to be fully open as described above allows the stator assembly to be fly wound at speeds faster than those that exist for conventional stator winding techniques and potentially enables slot fills greater than previously available.

FIGS. 3A and 3B also illustrate yet another preferred embodiment of the present disclosure, where web 43 and shields 44 are added to create a clearance between the coils and the stator stack when rounded into annular form. Web 43 and shields 44 run the entire length of each segment and are preferably made of plastic. As shown in FIGS. 3A and 3B, web 43 is designed in a manner so as to provide the flexibility to perform the winding process described hereinabove. Two shields 44 are provided on opposite sides of each containment structure to ensure that the winding coils are adequately insulated from each stator tooth.

Figure 4:
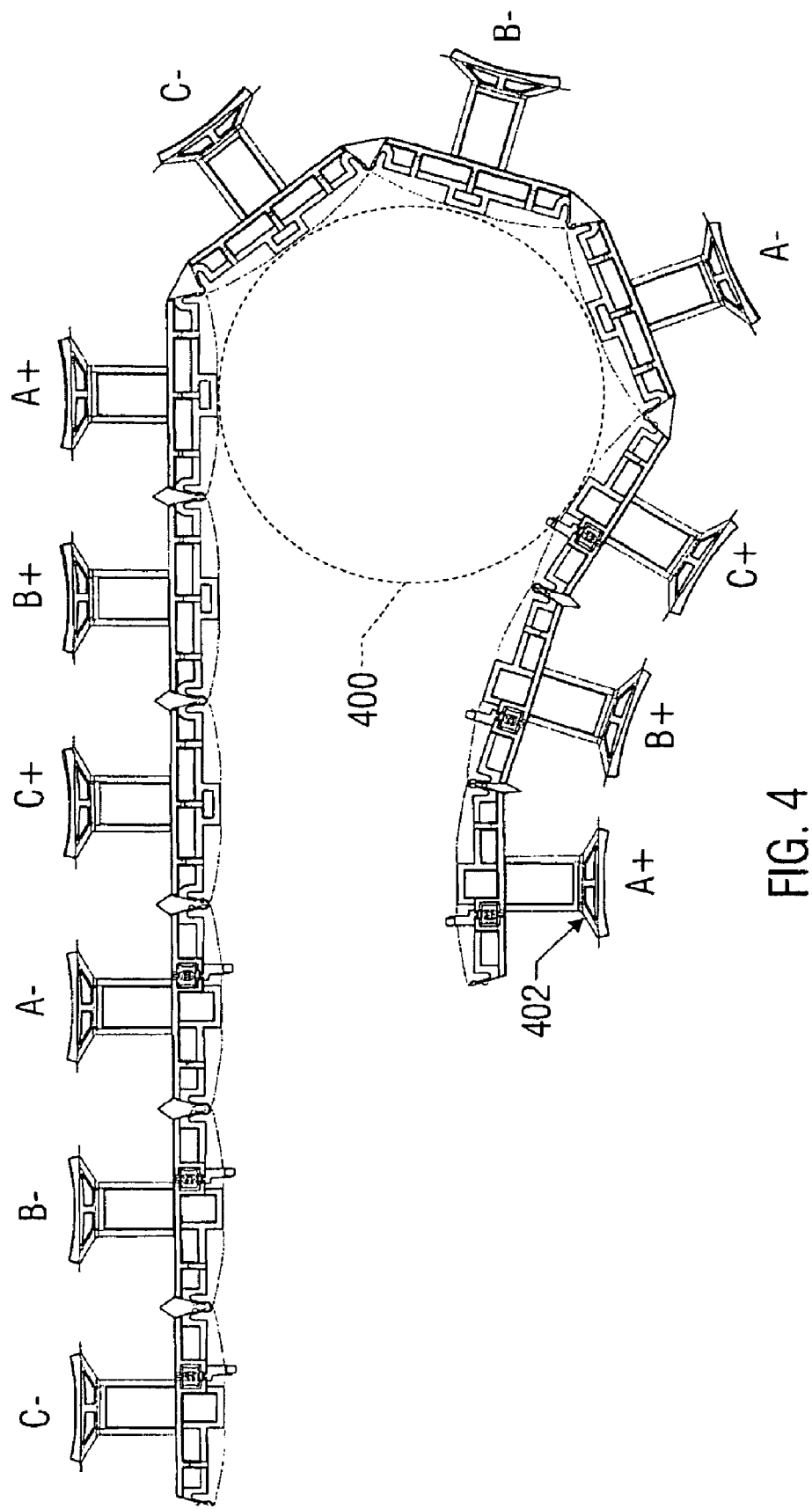
FIG. 4 generally illustrates aspects of a stator assembly formed in accordance with certain teachings of this disclosure and a process for winding such a stator assembly.

FIG. 4 generally illustrates a stator assembly 10 formed as described above in connection with FIGS. 1A-1D. In the illustrated stator assembly, there are to be three phase windings, A, B and C. In FIG. 4, each tooth of the stator is identified with a label identifying the phase winding to which it corresponds and the polarity of the winding to be placed about the stator tooth. As those of ordinary skill in the art will appreciate, by winding the winding coil about the stator tooth in a first direction one is able to achieve an electromagnet of a first polarity when the winding is energized in a first direction. By winding the coil in the opposite direction, when the winding coil is energized in the same direction, it is possible to establish an electromagnet of opposing polarity. Thus, FIG. 4 identifies each stator tooth as being associated with a phase winding A, B or C and a particular polarity + or −. The winding pattern of FIG. 4 is exemplary only and other winding patterns can be used without departing from the teachings of this disclosure.

Referring to FIG. 4 it may be noted that the winding operation is performed through the use of a tooling element 400 that engages features on the stator assembly 10 so as to move the stator assembly 10 during the winding operation. The tooling element 400 moves the stator assembly during operation such that, at various times, the stator assembly is positioned to expose differing stator teeth to enable easy and fast precision fly winding. For example, in FIG. 4, the stator assembly is positioned such that a set of stator teeth A−, B− and C− are exposed. Needle or fly winding techniques may be used to wind one or more of the exposed stator teeth. In this manner the stator assembly may be rapidly and quickly wound.

Regardless of whether fly or needle winding techniques are employed, and regardless of whether the stator assembly is wound in a configuration as illustrated in FIG. 1A or in the open configuration of FIG. 4, the exemplary stator assembly disclosed herein is constructed such that the phase windings can be placed in the stator assembly with no more than three starts and three finishes. For example in a winding operation where each stator tooth is individually wound, a winding operation could begin with the stator assembly positioned such that a winding coil is positioned about a first stator tooth (labeled A+ 402 in FIG. 4). The winding apparatus could then proceed to wind the next tooth corresponding to the phase A winding (labeled A− 402 in FIG. 4) without having to stop the winding process or cut the wire forming the phase winding. The process could continue until all of the teeth corresponding the phase winding were wound. After the phase A winding was completed, the next phase winding could be wound on the machine.

The winding approach and processes described above allowing for an "open" winding of the stator assembly 10 as depicted in FIG. 4 can be beneficially applied to stator assemblies having alternate constructions, such as stator assemblies where the stator segments are interconnected to one another directly by, for example, interlocking puzzle pieces.

Figure 5A:
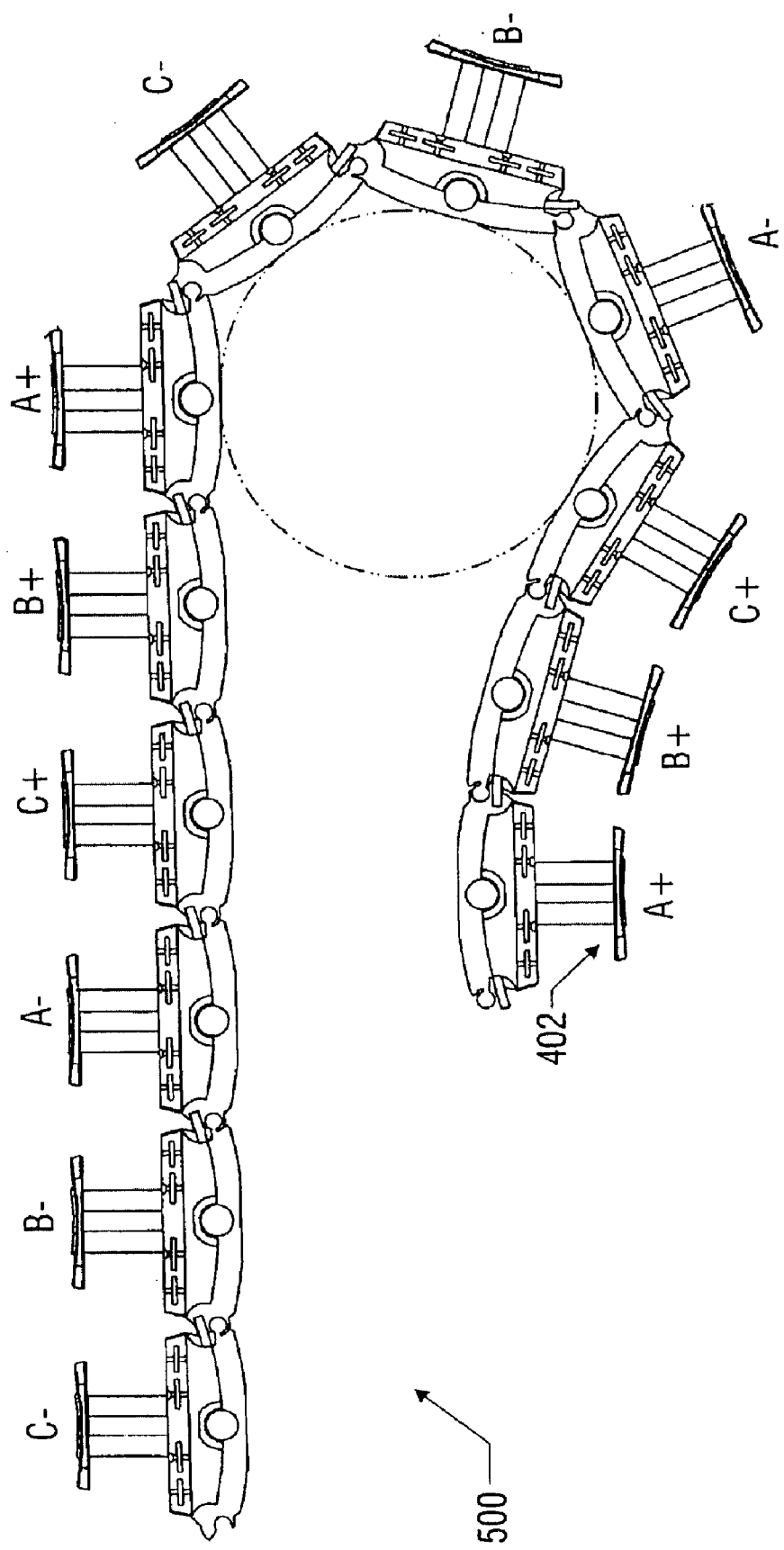

FIGS. 5A-5C generally illustrate a stator assembly 500 that is formed from stator segments 501 where the stator segments 501 are directly coupled together by interlocking puzzle pieces. The construction of the stator segments 501 and the insulators 501 used with such segments is such that the stator assembly may be fully opened to allow complete access to the winding. FIGS. 5B1 and 5B2 generally illustrate a stator segment 501 of the type used in the embodiment of FIG. 5A. The stator segment defines a yoke 502 and an extending tooth portion 503. The yoke 502 further defines a projecting element 504 and a receptive element 505, where the projecting element 504 is sized to fit into the receptive element 505 of a neighboring stator segment to create a chain-like stator assembly. The projecting element 504 defines upper and lower recesses and the receptive element defines upper and lower extensions. The upper and lower recesses are sized so as to receive the upper and lower extensions of an adjacent stator segment. This arrangement of interfering recesses and projections allows for the stator assembly to be opened for full and fast winding as described above.

FIGS. 5C1 and 5C2 generally illustrate the form of insulating elements that may be positioned about the stator segments of FIGS. 5B1 and 5B2 to produce the stator assembly of FIG. 5A. In general, the insulating elements comprise plastic elements that fit over the individual stator segments to insulate the winding coil to be placed about the stator tooth from the metal that forms the stator tooth. Each insulating element has an upper component 510 and a lower component 512, where each of the upper and lower components defines a top (or bottom) section that forms an insulating barrier between the top and bottom of the stator tooth and the winding coil and a downward (or upward) extension 514, 516 that serves to insulate the winding coil from the portion of the yoke that faces the interior bore of the stator. Other insulating materials (not illustrated) may be used to provide insulation between the sides of the stator tooth and the winding coil. Referring to FIGS. 5C1 and 5C1, it may be noted that the insulating elements may further define a projecting finger 518, 519. The projecting fingers 518, 519 may help keep the interlocking puzzle pieces from moving in an axial direction when the stator segments are coupled together, and thus tend to maintain the engagement of adjacent stator segments. Because the stator assembly 500 of FIGS. 5A-5C can be fully opened, it would be wound in accordance with the "open" winding processes described above in connection with FIG. 4.

It should be noted that the use of the containment structures 30 and 40 or the special interlocking puzzle elements of FIGS. 5A-5C allows for the construction of a stator assembly where a flexible chain or strip can be formed that contains all of the stator teeth that will be used to form the stator. Moreover, because the hinge 42 of the embodiment described in connection with FIGS. 1A-1D and the chain connection as depicted in FIGS. 5A-5D can be repeatedly opened and closed, it is possible to wind the described stator assemblies in a variety of ways and using a variety of processes where the number of starts and the number of finishes used in the winding operation is not greater than the number of phase windings. For example, in the winding operation described above in connection with FIG. 4 there are three start operations and three stop operations.

While the living hinge 42 of FIGS. 3A and 3B allows for a winding operation where the tooth to be wound is fully exposed, under certain circumstances it is desirable to have a stator assembly that, prior to winding, is not as flexible as that previously described. It may also be desirable that the hinge element is stiff such that the stator assembly is relatively inflexible during the winding operation. Such a stator assembly can be achieved in a number of ways. For example, the hinge element may be constructed of relatively thick plastic material such that flexing of the hinge during winding is inhibited. Alternatively, the containment structures 30 and 40, and therefore the hinge element may be formed from a relatively stiff material such that flexing is precluded. Alternatively, the rounding of the stator assembly into annular form may involve breaking the containment structure at the hinge element. Still other embodiments are envisioned where the hinge is essentially as described above in connection with FIGS. 3A and 3B, but where some additional stiffening support is provided to inhibit flexing of the stator assembly during the winding operation. Such an embodiment is generally illustrated in FIG. 6.

Figure 6:
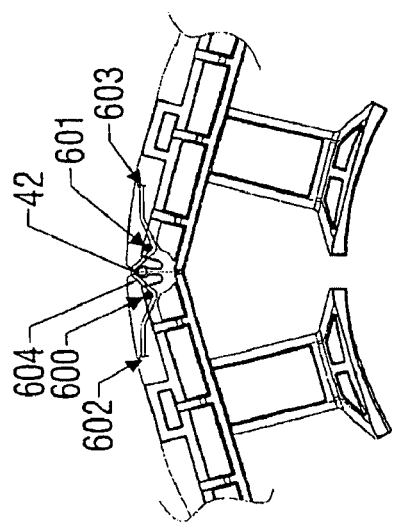
FIG. 6 generally illustrates an alternate embodiment of a hinge structure that may be used in connection with a stator assembly as described herein.

Referring to FIG. 6, two adjacent pockets from a containment structure are illustrated. The pockets have the same general structure as described above in connection with FIGS. 3A-3B, except for the inclusion of two retaining features 600 and 601 that may take the form of upwardly extending pins and two receptive elements 602 and 603 that may take the form of a small holes or openings in the pockets. In the illustrated embodiment a stiffening member 604, that may take the form of a bent wire, a shaped resilient plastic piece, or other flexible, yet stiff form, is provided that engages the retaining members and receptive elements and provides some stiffening of the hinge element 42. When the stator assembly is in the open, non-annular configuration, the stiffening remember will tend to prevent movement or flexing of the stator assembly as the strength of the stiffening member will be selected so as to overcome the bending forces that would typically be applied to the hinge element 42 during a winding operation. The stiffening member, however, would be selected to have a strength that is not sufficient to overcome the forces that would be applied to the stator assembly during the operation where the stator assembly is rounded into an annular form. During that operation, the stiffening would break, or preferably bend to avoid the creation of any potentially contaminating particles, to allow the stator assembly to be rounded in an annular form. In this embodiment, the stator assembly would be relatively stiff during its winding operation, such that the winding operation would proceed generally as described above (e.g., a winding operation where each phase winding is wound on the machine and where the number of stars and stops is equal to and/or no greater than the number of phase windings).

Once the stator assembly 10 as described above is completely wound, whether through an open winding operation as described in connection with FIG. 4, a winding operation with a stiffened stator assembly, or another winding method, the stator assembly will be rounded into an annular form for use as a stator element. When the stator assembly is so rounded, the edges of adjacent stator segments will come into physical contact with one another, thus producing a closed magnetic circuit.

There are several approaches that may be used to maintain the rounded stator assembly in its annular form. In one embodiment, the rounded assembly is simply inserted into a motor housing or shell in a press fit relationship such that the housing or shell serves to maintain the stator assembly in its annular form. In an alternate embodiment, some form of band or other external retaining structure may be used to circle or otherwise engage the annularized stator assembly so as to hold the stator assembly in the desired configuration. Still further embodiments are envisioned wherein one or more of the containment structures are provided with engagement or locking elements so that opposing ends of the stator assembly can engage and, thus maintain the stator assembly in an annular form.

Figure 7B:
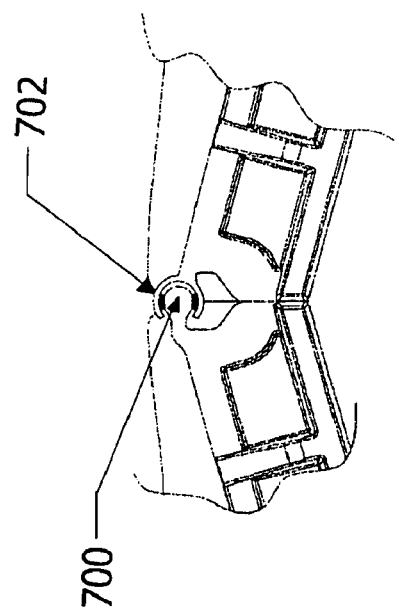
FIGS. 7A and 7B generally illustrate alternate engagement/locking structures that may be used with a stator constructed in accordance with certain teachings herein to retain the stator assembly in an annular form.
Figure 7A:
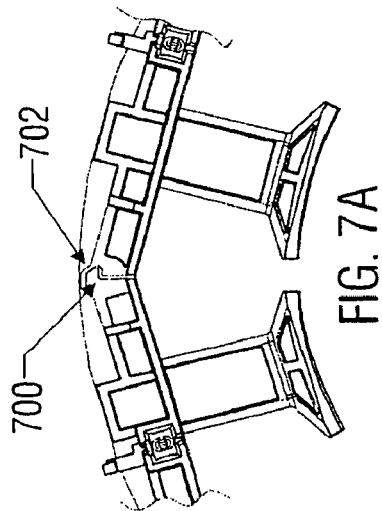

FIGS. 7A and 7B generally illustrate two alternate engagement/locking structures that may be provided on the containment structures to hold the stator assembly in an annular form. In the embodiment of FIG. 7A one of the pockets on one end of the stator assembly is provided with a projection 700 having a generally sloped front surface and a relatively flat back surface. The pocket on the opposing end defines a receptive element 702 having a latching finger. When the stator assembly is annularized and the projecting element is moved into engagement with the receptive element, the latching finger will lock down on the flat back of the extension 700 and tend to hold the stator in an annularized form. FIG. 7B illustrates an alternate configuration where a ball-and-socket form of engagement is provided.

It should be noted that the interlocking/engagement elements as exemplified in FIGS. 7A and 7B need not have a strength sufficient to hold the stator assembly in an annular form for all purposes. Such engagement elements may be used to hold the assembly together for interim manufacturing or testing operations while a motor housing, shell or other form of retention could be used a supplementary or alternate retaining structure effort in the final product.

One attribute that may be implemented in connection with the stator assemblies described herein is to route the wires used to form the winding coils in such a manner that they do not pass over or even near the hinge portions 42 of the containment structures 30 and 40, which bend when the stator assembly 10 is rounded to form an annular stator. In such an embodiment, features on the containment structure may be provided to actively preclude and prevent the wires forming the winding coils from passing over or in the vicinity of the hinges 42. Such features may help ensure that any motor constructed in accordance with certain teachings of this disclosure meets any applicable requirements that electrical conductors be at least an inch inward of the outer diameter of the stator assembly. These features further tend to ensure that the wires forming the phase winding do not interfere with pressing tools necessary to press the stator assembly into a secondary retentive device (e.g., a stator shell) used to hold the stator assembly together.

In the embodiment described above, the features on the containment structures will generally ensure that the wires that form the phase winding pass inwardly (i.e. on the rotor bore side) of the portion of the hinge element 42 where the bend occurs. Because the path of the winding wire is inward of the hinge 42, there will necessarily be minor flexure of the windings when the bending operation is performed. The features of the containment structures may be formed such that any flexure of the wire will be directed upward, downward or inward, but not outward towards hinge 42.

While the apparatus and methods of this invention have been described in terms of preferred embodiments, it will be apparent to those skilled in the art that variations may be applied to the apparatus and process described herein without departing from the concept and scope of the invention. For example, in the embodiment illustrated in FIGS. 1B and 1C, portions 34 and 37 of the containment structure serve to insulate the side edges of the stator teeth from the coils that are wound about such teeth. While such an embodiment is appropriate for many applications, in applications where the stack height of the motor is not consistent, such an embodiment may not be ideal as different containment structures would be required to provide the appropriate insulation for different stack heights. Thus one alternate embodiment would be to eliminate such portions of the containment structures and use different insulating materials (e.g., insulating strips) such that the same containment structures could be used for motors of different stack heights. Still further, alternate embodiments are envisioned wherein the containment structures are formed form a highly thermally conductive material or are filled with thermally conductive resin or other thermally conductive materials so as to aid in the removal of heat from the stator assembly during operation of the motor. Such modifications, as well as other substitutes and modifications are deemed to be within the scope and concept of the invention.

Having described the invention in detail, it will be apparent that modifications and variations are possible without departing from the scope of the invention defined in the appended claims.

What is claimed is:

1. A stator assembly comprising:
a plurality of discrete stacks of laminations, each of the stacks having a yoke and a tooth extending away from the yoke; and
a plurality of nonmagnetic containment structures defining pockets, the stacks being at least partially received in the pockets, the containment structures coupling the stacks to one another, the containment structures being moveable between a first configuration in which the stacks are separate from one another and a second configuration in which the yokes of adjacent stacks are in physical contact with one another to form a magnetic circuit.

2. A stator assembly as set forth in claim 1 wherein the second configuration comprises an annular configuration.

3. A stator assembly as set forth in claim 1 wherein each containment structure comprises a hinge for facilitating pivoting movement of the containment structure between the first and second configurations.

4. A stator assembly as set forth in claim 1 wherein the containment structures are further movable between a straight configuration in which the teeth of each stack are evenly spaced and arranged in a line and an open configuration in which the yokes of at least some adjacent stacks are arranged in an accurate configuration such that the spacing between the respective teeth is increased relative to the spacing of the straight configuration.

5. A stator assembly as set forth in claim 1 further comprising a continuous first wire, a continuous second wire, and a continuous third wire, each of the first, second, and third wires being coiled around at least one of said stacks.

6. A stator assembly as set forth in claim 5 wherein each of the first, second, and third wires is coiled around multiple stacks.

7. A stator assembly as set forth in claim 1 wherein each of the stacks includes two opposite ends and a middle extending between said ends and the containment structures include a first containment structure positioned to cap one of said ends of two or more of the stacks and a second containment structure positioned to cap another of said ends of said two or more stacks.

8. A stator assembly as set forth in claim 7 wherein the first and second containment structures contact one another adjacent the middles of the stacks.

\* \* \* \* \*